Figure 1:
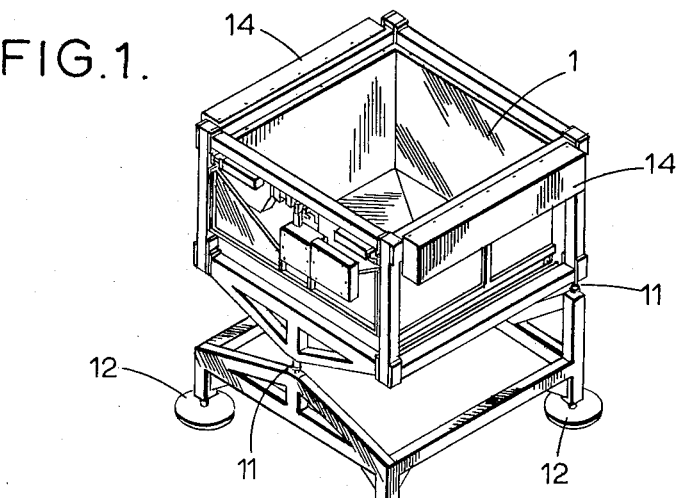

Dec. 21, 1965     L. A. FLETCHER ETAL     3,224,519
BATCH WEIGHER
Filed May 14, 1964     4 Sheets-Sheet 1

INVENTORS
LAWRENCE ALFRED FLETCHER
SIDNEY ALBERT PALMER
BY
Woodhams, Blanchard and Flynn
ATTORNEYS INVENTORS
LAWRENCE ALFRED FLETCHER
BY    SIDNEY ALBERT PALMER
Woodhams, Blanchard & Flynn
ATTORNEYS Dec. 21, 1965  L. A. FLETCHER ETAL  3,224,519
BATCH WEIGHER
Filed May 14, 1964  4 Sheets-Sheet 3

INVENTORS
LAWRENCE ALFRED FLETCHER
SIDNEY ALBERT PALMER
BY
Woodhams, Blanchard & Flynn
ATTORNEYS

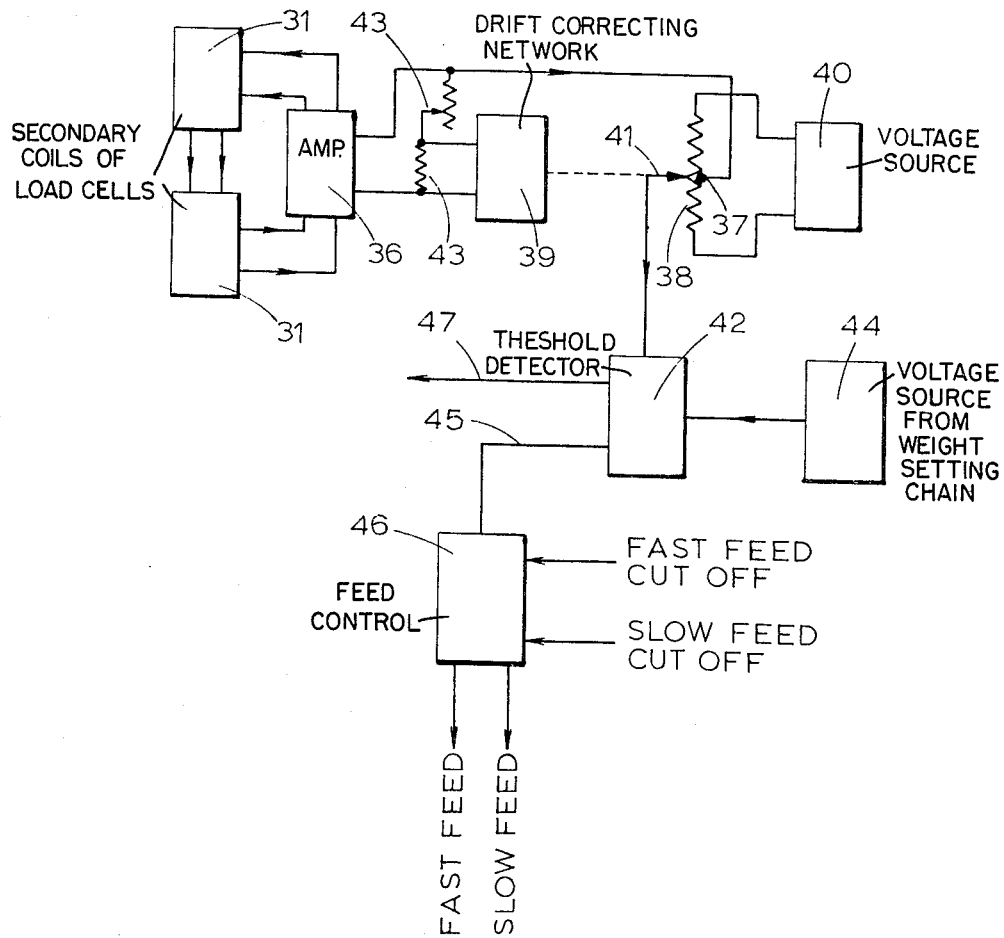

3,224,519
BATCH WEIGHER
Lawrence Alfred Fletcher, Claygate, Surrey, and Sidney Albert Palmer, Surbiton, Surrey, England, assignors to Lindars Automation Limited
Filed May 14, 1964, Ser. No. 367,498
10 Claims. (Cl. 177—210)

The invention relates to weighing apparatus including load cells and associated control circuits which provide an accurate high speed batchweigher suitable for mass production weighing and dispatch.

It is a disadvantage of conventional apparatus employing the steelyard principle of weighing and knife edge mounting that the weighing operation is slow and that the apparatus is sensitive to, and affected by, outside influences.

It is among the objects of the invention to provide a weighing apparatus which can be operated quickly, in which the effect of outside disturbances is minimized, and from which an electrical signal can be obtained indicating that the load applied to the apparatus is approaching or has reached a predetermined value.

Batch weighing apparatus according to the invention for weighing out loads of a specific weight, comprises in combination, a hopper to receive said loads, a rigid subframe, means for securing said hopper to said subframe, an external frame, cross spring members mounted at determined positions between said hopper and said external frame providing a parallelogram linkage system whereby inaccuracies caused by eccentric loading of said hopper are avoided, counter-balance weights to counter-balance the weight of said hopper, the hopper being thus mounted in stable equilibrium and mounted so as to be displaced on the application of said load an amount proportional to the weight of said load, load cells connected between said external frame and said hopper and effective to produce an electrical signal proportional to said displacement, and utilization means for responding to said signal.

Thus the hopper may be formed to be open ended provided with bottom doors and mounted on a cross spring suspension system to give a sensitive backlash-free parallelogram movement thus eliminating to a great degree the effects of eccentric loading. The suspension system may be in the form of a neutralized bridge which is effective to neutralize the major effects of external linear and coupling forces in all three planes, the system being balanced by means of two counterbalance weights, one on each side of the suspension bridge for a given nominal weight of the hopper.

According to the invention furthermore, a load cell comprises two parallel beam members one fixed and the other adapted for movement under the action of at least part of the load in the hopper, the beams of the load cell being advantageously connected by a parallelogram linkage of cantilever beams so that movement of the movable beam under the applied load, is in a direction parallel to the fixed beams, transducer means associated with the parallel beams provided to produce, on movement of the movable beam under the applied load, an electrical signal which is a function of the applied load.

By limiting the extent of movement of the movable beam the load cell may be protected against over loading.

Thus a load cell constructed according to the invention may comprise a pair of parallel rigid beams connected by two like cantilever beams disposed perpendicular to the parallel beams and formed to a smaller cross-section than the said rigid beams, the fixed rigid beam being provided with a perpendicular extension such that there is a gap between the unloaded end of the movable beam and the extension to the fixed beam; this mechanical assembly is preferably machined from a solid block of metal, and an inductive bridge transducer is provided which comprises a primary coil having a center-pole configuration mounted on the fixed beam and a secondary or detector coil which links with the primary magnetic field mounted on the movable beam.

The displacement of the movable beam under a given applied load or force is determined by the length, cross section and kind of material, advantageously metal, of the cantilever arms, and because of the parallelogram linkage afforded by the cantilever beams, this displacement will be linearly proportional to a load or force applied along the longitudinal axis through the center of gravity of the movable beam.

The advantages of machining the rigid beams and the cantilever connections from a solid block of suitable metal are that possible errors, which may occur in the construction of a prefabricated unit, are reduced, and that the effects of differential expansion of the various members of the units are virtually eliminated. For a suitable metal the length and cross-sectional area of the cantilever beams are the factors which determine the displacement of the movable beam under given load or force, and therefore the range of loads or forces for which the unit may be utilized can be readily calculated and the unit machined to order.

A square waveform current is advantageously applied to the primary coil and, since the detector coil is physically adjustable to give an output which may be presented on a suitable meter as an indication of the value of the load or force applied to the hopper or an indication of the percentage or actual variation of the load or force from a desired or given value whereby means feeding the load into the hopper may be regulated or stopped so that the hopper is filled with the desired quantity of load.

Figure 2:
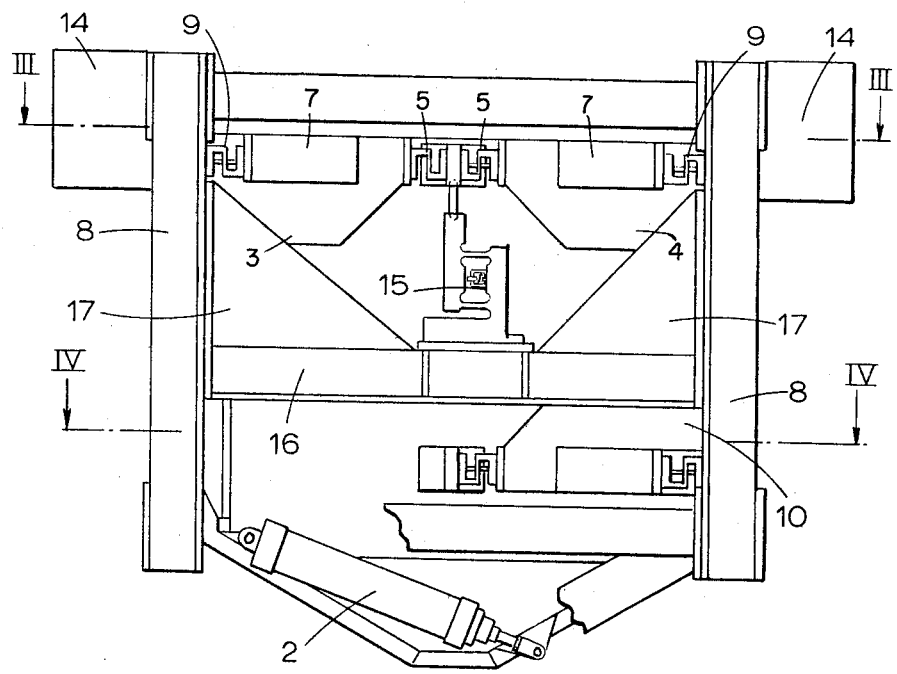
Figure 3:
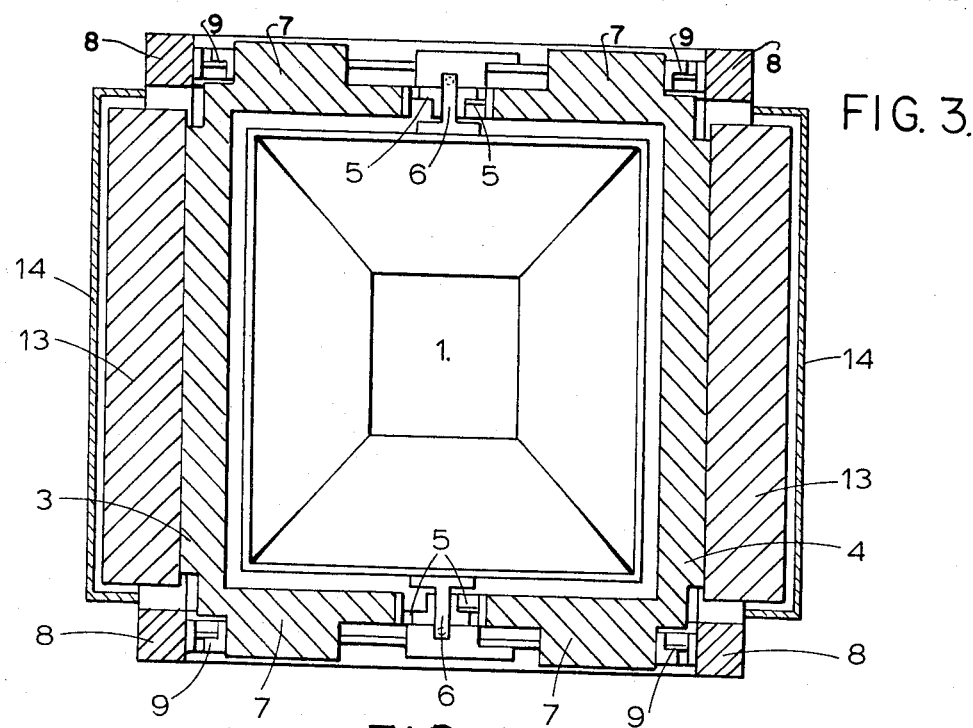
Figure 4:
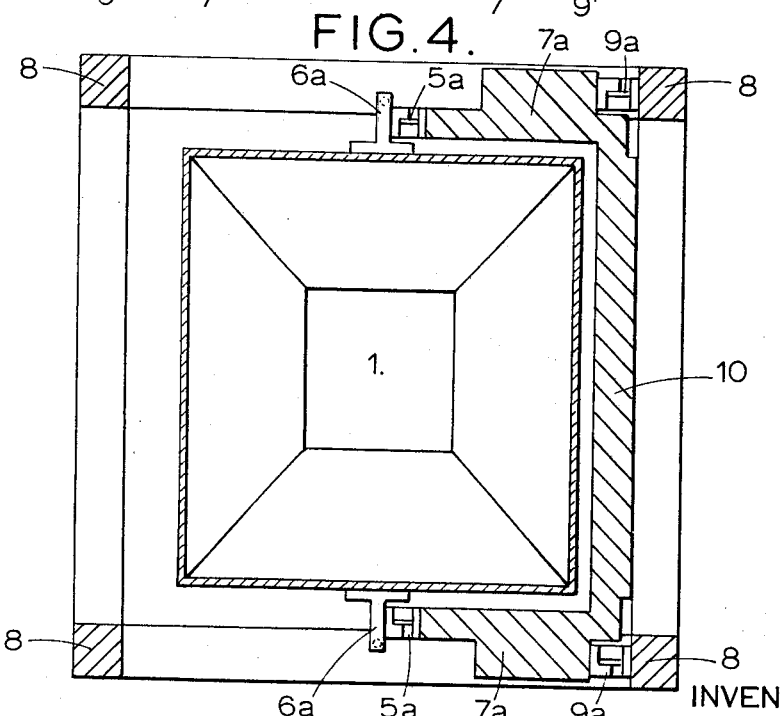
Figure 5:
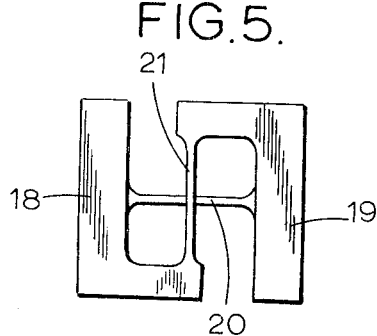
Figure 6:
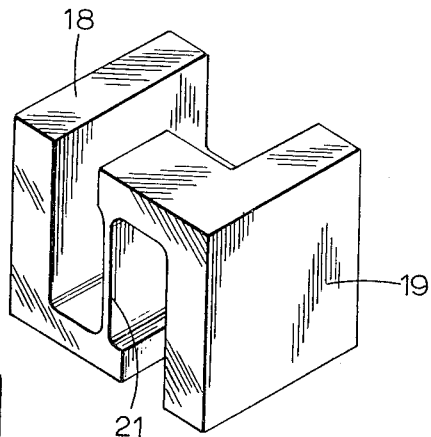
Figure 8:
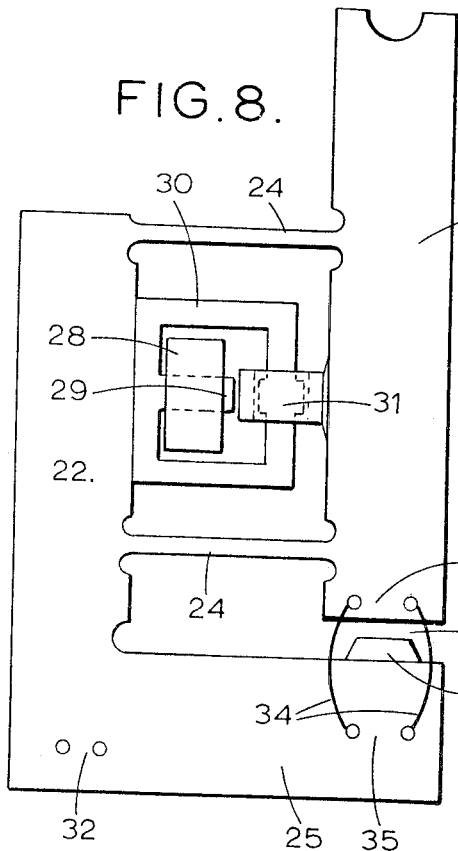
Figure 7:
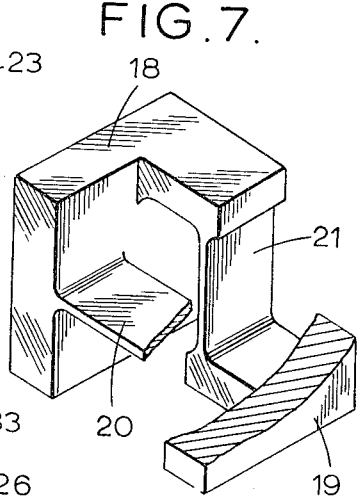

One embodiment of a batch weigher, shown by way of example only, is illustrated in the drawings accompanying the specification in which:

FIGURE 1 is an isometric view of the batchweigher;
FIGURE 2 is an elevation of one side of the batchweigher showing the suspension system and the pneumatic means for operating the hopper doors;
FIGURE 3 is a sectional plan view on line 3—3 of FIGURE 2;
FIGURE 4 is a sectional plan view on the line 4—4 of FIGURE 2;
FIGURES 5, 6 and 7 are details of the cross spring units used in the suspension system;
FIGURE 8 is an elevation of a load cell;
FIGURE 9 is a semi-circuit diagram showing the control means for the batchweigher.

In the batch weigher illustrated in FIGURES 1 to 4 there is provided an open topped hopper 1 having bottom doors preferably of the clam shell type, and operated by a pneumatic ram 2. The hopper 1 is mounted within the two halves 3 and 4 of a subframe and is suspended therefrom by means of four cross springs 5 (described in greater detail below) connected between a lug 6 on the hopper and the ends of the subframe halves 3 and 4.

The subframe halves 3 and 4 are provided with blocks 7 and are suspended from the corner posts 8 of an external rectangular main frame by means of four further cross springs 9.

A lower subframe 10, provided adjacent the lower end of the hopper, is secured to lugs 6a on the hopper 1 by cross springs 5a and is provided with blocks 7a whereby the subframe may be suspended from the corner posts 8 of the main frame by cross springs 9a.

The external frame is provided with a three point mounting 11 to eliminate coupling stresses within the framework and the base of the three point mounting is adjustable, as by screws 12, to maintain the corner posts 8 of the external frame in a vertical position. Counterbalance weights 13 secured to the outside edges of the subframes 3 and 4 are provided within housings 14 to counteract the deadweight of the hopper 1 and of the subframes 3, 4 and 10. The cross springs 5 and 9 provide a parallelogram linkage system which is effective to minimize inaccuracies caused by eccentric loading of the hopper. The lower cross springs 5a and 9a and the subframe 10 prevent the lower part of the hopper oscillating.

Load cells 15 are provided at each end of the batch-weigher and are mounted between the lugs 6 on the hopper and horizontal members 16 forming part of the external frame whereby an electrical signal dependent on the displacement of the hopper due to an applied load is provided when a load is applied to the hopper. Web members 17 are provided to prevent distortion of the members 16.

The signals from the load cells at the opposite ends of the hopper are mixed and a mean level obtained whereby the effects of eccentric loading are minimized.

As shown in FIGURES 5, 6 and 7 each cross spring unit 5, 5a, 9 and 9a comprises two mounting blocks 18 and 19 connected by a transverse web member 20 and a longitudinal web member 21. The cross spring units are advantageously cast from high tensile steel thus simplifying the manufacture of the batch-weigher and providing a friction-less bearing which is not affected by foreign matter.

At each end of the batch-weigher the horizontal transverse web 20 of one of the cross springs 5 is omitted, thus jamming is prevented and the end members of the subframes 3 and 4 can pivot easily about the cross springs 9.

As shown in FIGURE 8 a load cell comprises a fixed beam 22, a movable beam 23 and cantilever arms 24 between the beams 22 and 23, the parts 22, 23, 24 being advantageously machined from a solid metal block or cast as a single unit.

The fixed beam 22 has a perpendicular projection 25 extending from the lower end laterally thereof in a direction such that a gap 26 is formed between the movable beam 23 and the laterally extending projection 25. A stop 27 is advantageously mounted on the projection 25 in the gap 26 whereby it may be insured that the maximum displacement of the movable beam 23 is within the elastic limit of the metal of the cantilever arms 24 providing the parallelogram linkage between the beams 22, 23 so that the mechanical assembly is protected against overloading.

In the space between the beams 22 and 23 and the cantilever arms 24 there is mounted an inductive bridge transducer comprising, mounted on the beam 22 a primary coil 28 having a center pole magnetic core 29 with a frame 30 for completing the electromagnetic circuit passing through the core of a secondary or detector coil 31 mounted on the beam 23.

The portion of the frame 30 passing through the coil 31 is enlarged at a position which corresponds to the midpoint of the core when no load is applied to the load cell.

The coil 28 connects with terminals 32 provided on the part 25 of the fixed beam 22 and the coil 31 connects with terminals 33 being substantially frictionlessly connected to terminals 35 on the part 25 as by wire loops 34.

In operation an oscillating electrical signal is applied to the coil 28 by a square wave generator by way of the terminals 32. An oscillatory signal will be induced in the detector coil 31 and this signal is taken from the terminals 35, electrical or electronic means being provided whereby the detected signal or a function of the detected signal may be measured either directly, or the variation of the detected signal or a function thereof from that present when the beam 25 is unloaded or under a predetermined load is measured. When the beam 23 is loaded it will be displaced, the value of the detected signal will be changed, and the difference between the value of the detected signal when the beam 23 is loaded and the value when it is unloaded will be directly proportional to the displacement of the beam 23 and thus to the loading of the beam.

The load cells may be coupled to the hopper lug 6 by means of a wobble pin, that is to say, a pin with accurately ground hemispherical ends which ends fit into accurately ground hemispherical depressions in the underside of the lug 6 and in the upper face of the movable beam 23.

Referring to FIGURE 9, the output of the secondary coils 31 of the load cells are fed into a load cell servo amplifier 36. The output from the servo amplifier 36 is fed between a reference point 37 on a resistance 38 and a drift correcting network 39. A stabilized D.C. supply, isolated from earth, is fed across the resistance 38 from a source 40. A slider 41 on the resistance 38 is position controlled by the network 39 and under normal no load conditions is positioned at the point 37. However after the batch-weigher has been operated, for example with a powdered load, small deposits of load tend to accumulate on the upper faces of the hopper walls and on the counter-balance weights thereby creating an increasing error. This error is shown as a voltage output from the amplifier 36, under no load conditions.

To correct for this error a proportion of the voltage, the proportion being governed by resistances 43, is fed to the network 39 and is effective to move the slider 41 along the resistance 38. Movement of the slider along the resistance 38, is due to the source 40, effective to cause a voltage difference between the point 37 and the slider 38 which difference is equal and opposite to the error voltage, this voltage difference remains constant over the entire operating range of the batch-weigher and thus insures full drift correction on a lead from the slider 41 to a threshold detector 42 which detector is thus supplied with a voltage which is always proportional to the load applied to the hopper. The drift correcting network must be disengaged for example by breaking the mechanical link with the slider 41, before any load is applied to the hopper. The threshold detector is also fed with a voltage from a weight setting chain 44 which voltage is proportional to the desired weight to be weighed out by the batch weigher.

The threshold detector 42 compares the two voltages fed to it and produces a signal on a line 45 which is fed to a feed control 46. A further line 47 from the threshold detector 42 operates a target indicator when the load in the hopper reaches the desired weight set on the weight setting chain 44.

In operation the load is fed into the hopper by a fast feed controlled by the feed control 46. When the load approaches the desired weight the control 46 cuts off the fast feed and switches to slow feed, the slow feed is subsequently cut off immediately before target weight so that the amount of feed in mid air between feeder and hopper brings the hopper load exactly to target weight. Fast accurate and automatic apparatus for batch weighing is thus provided by the invention.

We claim:
1. Batch weighing apparatus, comprising:
an external frame;
a symmetrical hopper of downwardly tapering section mounted within said external frame and gate means at the lower end of the hopper for controlling the discharge of the contents of the hopper;
means including spring means and counterbalance weights for mounting said hopper in stable equilibrium on said frame;
load cell means mounted on said external frame and connected to said hopper and responsive to a displacement of said hopper with respect to said frame in response to an applied load for providing an electrical signal which is a measure of the displacement of said hopper; and utilization means connected for responding to said signal.

2. Batch weighing apparatus according to claim 1, in which;
a plurality of load cells are provided on the sides of said hopper and wherein said utilization means includes means for mixing the electrical signals from said load cells in order to determine a mean level of operation of the hopper.

3. Batch weighing apparatus according to claim 1, in which the means for mounting said hopper include a plurality of cross-spring units connected between said hopper and said frame, each said cross-spring unit being formed as a one-piece unit by machining from a solid block and being arranged to define a parallelogram linkage between said hopper and said frame to minimize inaccuracies caused by eccentric loading of the hopper.

4. Batch weighing apparatus according to claim 1, including a rigid subframe to which said hopper is secured;
cross-spring units connecting said subframe to said external frame;
a base; and
means providing a three point mounting of said external frame on said base.

5. Batch weighing apparatus according to claim 1, in which the load cell means comprises two parallel beams, one beam being fixed to said frame and the other beam being connected to said hopper so as to be movable in response to at least a part of the load in the hopper;
cantilever arms connecting said beams in the form of a parallelogram linkage so that said other beam is supported for movement in a direction parallel to said one beam; and
a primary coil mounted on one beam having a center pole magnetic core and an external frame, a secondary coil mounted on the other beam with a portion of said external frame passing through said secondary coil and being in inductive relationship therewith.

6. Batch weighing apparatus according to claim 5, in which said beams and said arms are integral with each other and are machined from a solid block.

7. Batch weighing apparatus according to claim 1;
in which the utilization means comprise in combination a load cell servo amplifier connected to said load cell means for receiving a signal therefrom;
a drift correcting network connected to said amplifier including servo means effective to provide automatic correction for a zero error signal being fed from said load cells;
a threshold detector connected to said load cell servo amplifier for responding to the signal therefrom;
means for supplying a voltage proportional to the weight of a weight setting chain to said threshold detector;
a feed control connected to said threshold detector for controlling the feed of loads to the hopper; and
indicating means to signal when the load in the hopper reaches the determined weight set by said load setting chain.

8. Batch weighing apparatus according to claim 7;
in which the drift correcting network includes automatic servo means operable to move a sliding connection along a resistance;

said resistance being connected across an isolated direct current supply;
the feed from the load cell servo amplifier being connected to a fixed point on the resistance; and
movement by the automatic servo means of the sliding connection away from the fixed point being effective to produce a compensating voltage between the fixed point and the sliding connection which compensating voltage is equal and opposite to the zero error signal produced by the load cells.

9. Batch weighing apparatus according to claim 7;
in which the output from said load cell servo amplifier, after correction by said drift correcting network is fed to said threshold detector;
said threshold detector controlling the energization of fast and slow feeds to the hopper of material to be weighed out in batches whereby the feeds are cut off automatically so that a desired weight of material is deposited in said hopper.

10. Batch weighing apparatus, comprising:
an upright open-topped hopper having a lower portion of downwardly tapering cross section and having closure means at the lower end thereof for releasably closing the lower end of said hopper;
a rigid subframe comprised of two opposed subframe halves which are substantially channel-shaped in cross section and which substantially encircle said hopper;
first cross springs on the outside of said hopper and located between the opposing ends of said subframe halves and connected to said hopper and said subframe halves whereby said hopper is suspended from said subframe;
an external frame located outside of said subframe and second cross springs connecting said subframe to said external frame whereby said subframe is suspended from said external frame, said first and second cross springs forming a parallelogram linkage system to minimize inaccuracies caused by eccentric loading of said hopper;
counterbalance weights mounted on the outside of said subframe for counterbalancing the weight of said hopper;
symmetrically arranged load cells mounted on said external frame and connected to said hopper and responsive to a displacement of said hopper with respect to said frame in response to an applied load for providing a signal which is a measure of the displacement of said hopper; and
utilization means connected for responding to said signal.

References Cited by the Examiner
UNITED STATES PATENTS

| | | | |
|---|---|---|---|
| 2,859,613 | 11/1958 | Green | 73—141 |
| 2,868,491 | 1/1959 | Thorsson et al. | 177—70 |
| 2,932,501 | 4/1960 | Hicks | 177—210 X |
| 2,938,701 | 5/1960 | Thorsson et al. | 177—210 |
| 2,939,694 | 6/1960 | Bardley | 177—210 |
| 3,053,332 | 9/1962 | Buchtenkirch et al. | 177—210 |
| 3,077,940 | 2/1963 | Blodgett et al. | 177—211 X |
| 3,081,830 | 3/1963 | Spademan | 177—211 X |
| 3,112,805 | 12/1963 | Williams | 177—201 X |
| 3,148,742 | 9/1964 | Giulie | 177—246 X |

LEO SMILOW, *Primary Examiner.*